US012600292B2

(12) United States Patent
Mori et al.

(10) Patent No.: US 12,600,292 B2
(45) Date of Patent: Apr. 14, 2026

(54) SENSOR AND INDICATOR LIGHT MOUNTING STRUCTURE, AND CARGO HANDLING VEHICLE

(71) Applicant: KABUSHIKI KAISHA TOYOTA JIDOSHOKKI, Aichi-ken (JP)

(72) Inventors: Hiroki Mori, Kariya (JP); Tadayuki Yakushi, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 351 days.

(21) Appl. No.: 18/242,190

(22) Filed: Sep. 5, 2023

(65) Prior Publication Data

US 2024/0083349 A1 Mar. 14, 2024

(30) Foreign Application Priority Data

Sep. 9, 2022 (JP) ................................. 2022-144013

(51) Int. Cl.
*B60Q 1/26* (2006.01)
*B60Q 1/00* (2006.01)
*G01S 17/04* (2020.01)

(52) U.S. Cl.
CPC ......... *B60Q 1/2623* (2013.01); *B60Q 1/0023* (2013.01); *B60Q 1/0035* (2013.01); *G01S 17/04* (2020.01)

(58) Field of Classification Search
CPC .. B60Q 1/0035; B60Q 1/0023; B60Q 1/2623; B60Q 1/26; B60Q 1/507; G01S 17/04; G01S 17/00; G01S 13/88; G01S 13/881
See application file for complete search history.

(56) References Cited

U.S. PATENT DOCUMENTS

| | | | |
|---|---|---|---|
| 2015/0006005 A1 | 1/2015 | Yu et al. | |
| 2018/0081369 A1* | 3/2018 | Fischer | G05D 1/0231 |
| 2022/0267128 A1* | 8/2022 | Han | B66F 9/0755 |

FOREIGN PATENT DOCUMENTS

| | | | |
|---|---|---|---|
| CN | 215711545 | 2/2022 | |
| CN | 217201921 | 8/2022 | |
| DE | 102020201698 | 8/2021 | |
| JP | 51-43373 | 10/1976 | |
| JP | 7-116231 | 5/1995 | |
| JP | 2007-192095 | 8/2007 | |
| JP | 2020-66401 | 4/2020 | |
| WO | WO-2016016935 A1 * | 2/2016 | B66F 9/0785 |

* cited by examiner

*Primary Examiner* — Dany E Akakpo
(74) *Attorney, Agent, or Firm* — Greenblum & Bernstein, P.L.C.

(57) ABSTRACT

A sensor and indicator light mounting structure comprising: a single sensor configured to observe an obstacle by emitting an emission wave to an area around a vehicle body of a cargo handling vehicle and receiving a reflection of the emission wave; a single indicator light configured to notify a person around the vehicle body of a presence of the cargo handling vehicle; and a mounting member configured to mount the sensor and the indicator light on the vehicle body, wherein the mounting member is configured to be disposed on an upper surface of the vehicle body, the sensor and the indicator light vertically overlap each other to be mounted on the mounting member, and the indicator light is arranged below the sensor.

5 Claims, 4 Drawing Sheets

SENSOR AND INDICATOR LIGHT MOUNTING STRUCTURE, AND CARGO HANDLING VEHICLE

FIELD

The present disclosure relates to a sensor and indicator light mounting structure, and a cargo handling vehicle.

DESCRIPTION OF RELATED ART

Japanese Laid-Open Patent Publication No. 2020-66401 discloses a work vehicle that includes a rear monitoring camera, a rear obstacle sensor, and a positioning detection device. Each of the rear monitoring camera, the rear obstacle sensor, and the positioning detection device is a device for assisting autonomous driving of the work vehicle. The rear monitoring camera and the rear obstacle sensor are disposed at a rear portion of the roof of the work vehicle. The positioning detection device is disposed on an upper surface of the roof. In addition, the work vehicle disclosed in the above publication includes, for example, two indicator lights. Each indicator light distinctively displays, for example, whether an anomaly has occurred in the work vehicle or whether an obstacle has been detected. The two indicator lights are disposed on the left and right sides of the roof, respectively.

In recent years, the autonomous driving of a work vehicle can be assisted using only a single device. For the single device to completely acquire information on the area around the work vehicle from all directions, the single device needs to be disposed at an appropriate position in the work vehicle. Further, it is desired that the number of indicator lights be reduced. However, in this case, a decrease in the visibility of the indicator light needs to be limited.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a sensor and indicator light mounting structure. The mounting structure includes a single sensor configured to observe an obstacle by emitting an emission wave to an area around a vehicle body of a cargo handling vehicle and receiving a reflection of the emission wave, a single indicator light configured to notify a person around the vehicle body of a presence of the cargo handling vehicle, and a mounting member configured to mount the sensor and the indicator light on the vehicle body. The mounting member is configured to be disposed on an upper surface of the vehicle body. The sensor and the indicator light vertically overlap each other to be mounted on the mounting member. The indicator light is arranged below the sensor.

An aspect of the present disclosure provides a cargo handling vehicle. The cargo handling vehicle includes a vehicle body a single sensor configured to observe an obstacle by emitting an emission wave to an area around the vehicle body and receiving a reflection of the emission wave, a single indicator light configured to notify a person around the vehicle body of a presence of the cargo handling vehicle, and a mounting member configured to mount the sensor and the indicator light on the vehicle body. The mounting member is configured to be disposed on an upper surface of the vehicle body. The sensor and the indicator light vertically overlap each other to be mounted on the mounting member. The indicator light is arranged below the sensor.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in art.

In this specification, "at least one of A and B" should be understood to mean "only A, only B, or both A and B."

An embodiment of a sensor and indicator light mounting structure and a cargo handling vehicle will now be described with reference to FIGS. 1 to 8.

Cargo Handling Vehicle

Figure 1:
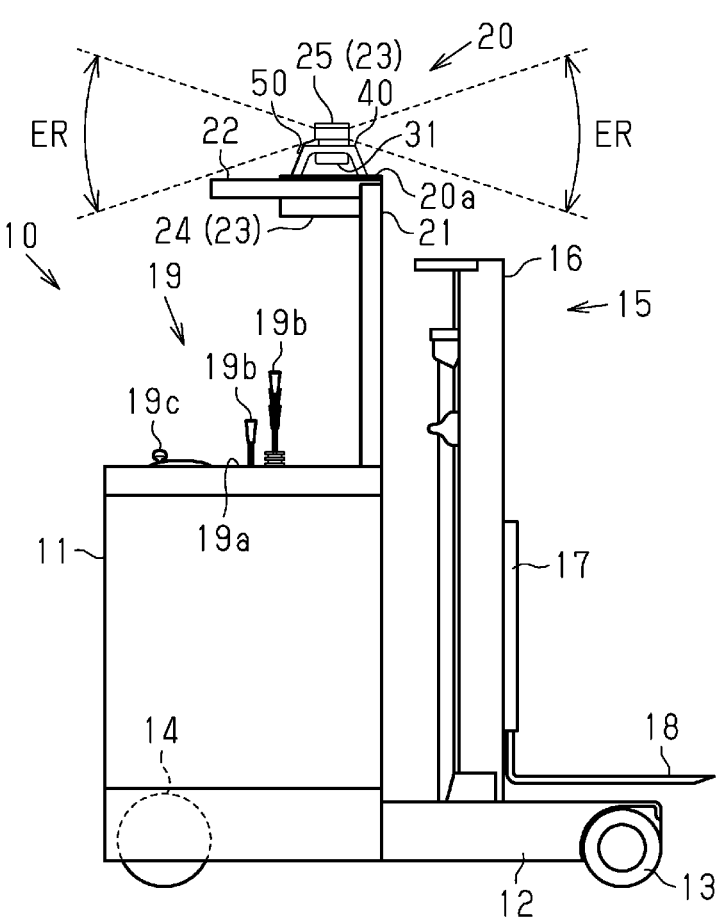
FIG. 1 is a side view showing a cargo handling vehicle.

As shown in FIG. 1, a cargo handling vehicle 10 is a reach forklift. The cargo handling vehicle 10 may be a counterbalance forklift. The cargo handling vehicle 10 operates automatically. The operation mode of the cargo handling vehicle 10 may be switchable so that the cargo handling vehicle 10 is operated autonomously or manually. In the following direction, the "front," "rear," "left," and "right" directions are defined with reference to the cargo handling vehicle 10.

The cargo handling vehicle 10 includes a vehicle body 11. The cargo handling vehicle 10 includes reach legs 12. Two reach legs 12 are spaced apart from each other in the left-right direction. The reach legs 12 extend forward from the vehicle body 11.

The cargo handling vehicle 10 includes front wheels 13. Each reach leg 12 has a corresponding front wheel 13. The cargo handling vehicle 10 includes rear wheels 14. The rear wheels 14 are disposed on the vehicle body 11.

The cargo handling vehicle 10 includes a cargo handling device 15. The cargo handling device 15 is located in front of the vehicle body 11. The cargo handling device 15 includes a mast 16. The mast 16 is guided by the reach legs 12. The mast 16 is provided with left and right forks 18 via a lift bracket 17. The forks 18 are elevated and lowered relative to the mast 16 by the lift bracket 17. The mast 16 moves in the front-rear direction. Since the lift bracket 17 tilts in the front-rear direction, the forks 18 tilt together with the lift bracket 17.

The vehicle body 11 includes a driver's cabin 19. The driver's cabin 19 is located at a rear portion of the vehicle body 11 on one side in the left-right direction. The driver's cabin 19 is of a standing type. The vehicle body 11 includes an instrument panel 19a. The instrument panel 19a is located on the front side of the driver's cabin 19 of the vehicle body 11. The vehicle body 11 includes operation levers 19b and a steering device 19c. The operation levers 19b and the steering device 19c are disposed on the instrument panel 19a.

Figure 2:
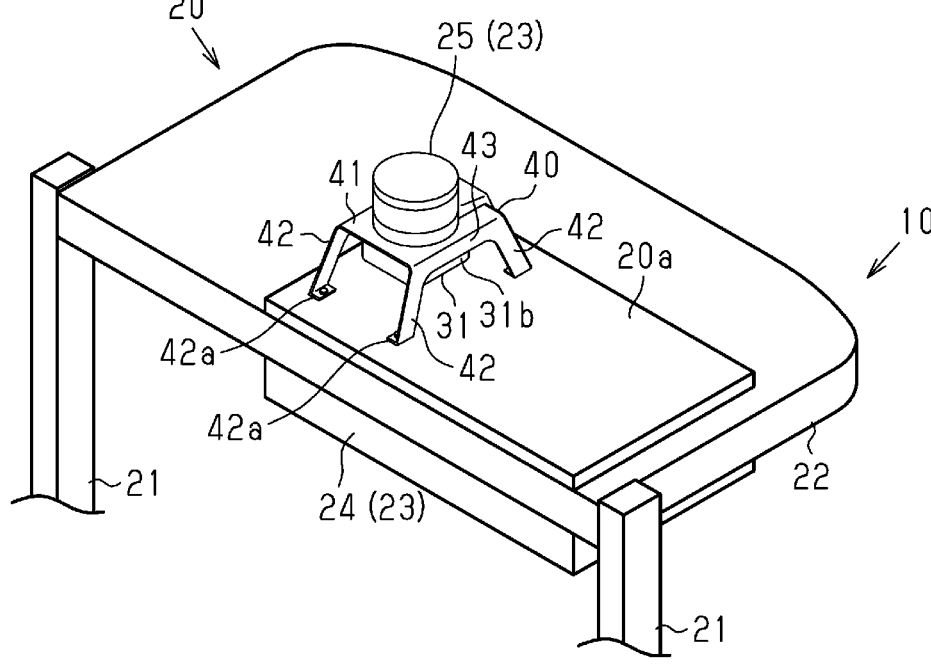
FIG. 2 is a partial perspective view showing an upper frame of the cargo handling vehicle of FIG. 1 and members disposed around the upper frame.

As shown in FIG. 2, the cargo handling vehicle 10 includes an upper frame 20. The upper frame 20 includes two side frames 21 and a head cover 22. Each of the two side frames 21 is located at a front portion of the vehicle body 11. The two side frames 21 extend vertically. The head cover 22 is located at upper ends of the two side frames 21. The head cover 22 covers the driver's cabin 19 from above. A mounting plate 20a is fixed to an upper surface of the head cover 22. The mounting plate 20a is fixed to a front portion and a side portion of the head cover 22.

The cargo handling vehicle 10 includes an obstacle detection device 23. The obstacle detection device 23 detects an obstacle that hinders the movement of the cargo handling vehicle 10. The obstacle detection device 23 includes a control device 24 and a single sensor 25. The control device 24 is located on a lower surface of the head cover 22. The control device 24 detects an obstacle based on the observation result of the sensor 25. The method for detecting an obstacle performed by the obstacle detection device 23 is known, and thus will not be described in detail.

The sensor 25 observes an obstacle located around the vehicle body 11 of the cargo handling vehicle 10. The sensor 25 is capable of measuring the distance to a point and the direction of the point. In the present embodiment, the sensor 25 is a laser distance meter. The laser distance meter may be referred to as a laser imaging detection and ranging (LIDAR) sensor or a laser rangefinder.

Figure 3:
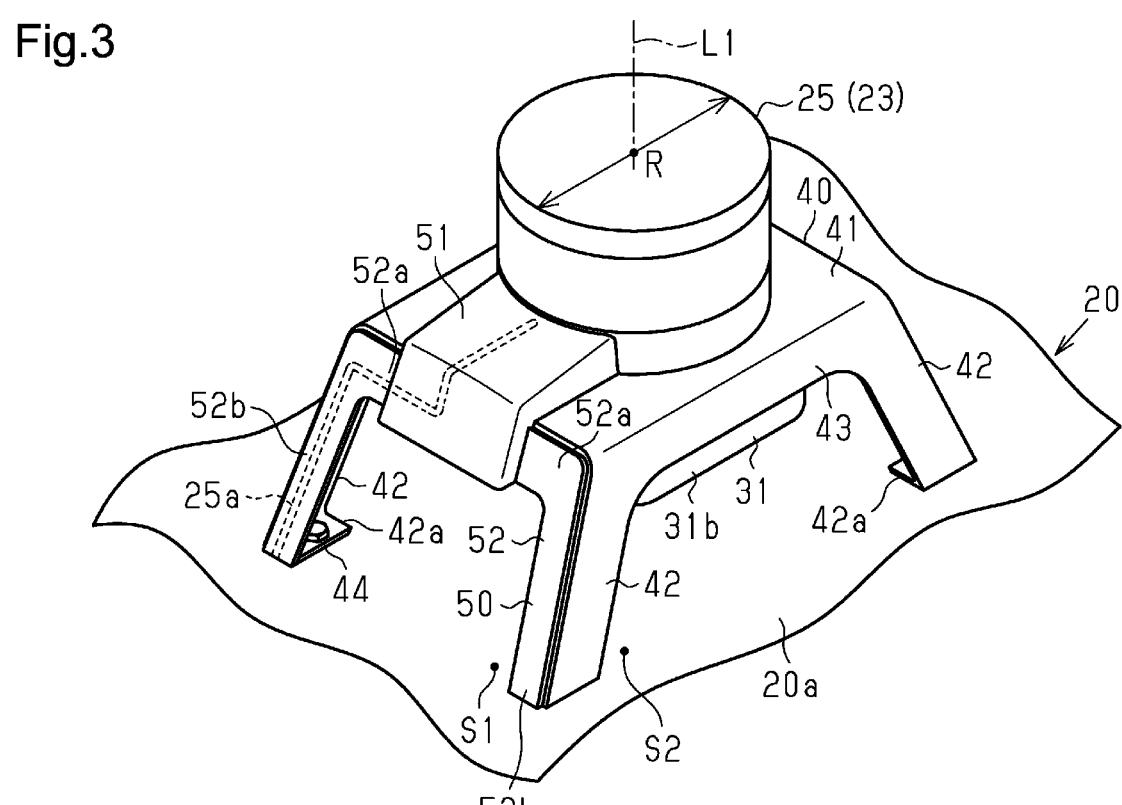
FIG. 3 is a perspective view of the sensor, the indicator light, and the mounting member that are shown in FIG. 2.

As shown in FIG. 3, the sensor 25 has a cylindrical shape. A sensor center axis L1 passing through the center of the cylinder of the sensor 25 extends vertically. The sensor 25 emits a laser beam as an emission wave over a range of 360° around the sensor center axis L1. As shown in FIGS. 1 and 6 to 8, preferably, the emission range ER of the laser beam emitted from the sensor 25 may be set so as not to interfere with the cargo handling vehicle 10, specifically, not to interfere with even a part of the cargo handling vehicle 10 such as the head cover 22. The sensor 25 is a distance meter capable of recognizing its surrounding environment by receiving a laser beam (reflected light) reflected from the point where the laser beam hits. Thus, the sensor 25 observes the obstacle by emitting the emission wave to an area around the vehicle body 11 and receiving a reflection of the reflected emission wave. In this context, the obstacle includes an obstacle that interferes with the movement of the cargo handling vehicle 10 and an object that does not interfere with the movement of the cargo handling vehicle 10.

The sensor 25 includes a cable 25a for outputting a detection signal or inputting a signal. Although not shown in detail, the cable 25a passes through the head cover 22 and the mounting plate 20a to be connected to the control device 24. The sensor 25 has a diameter R.

As shown in FIGS. 5, 6, 7, and 8, the cargo handling vehicle 10 includes an indicator light 31. The indicator light 31 is disposed to notify people around the cargo handling vehicle 10 of the state and presence of the cargo handling vehicle 10. The indicator light 31 has a quadrangular prism shape. The indicator light 31 includes a mounting portion 31a and a rotating beacon light 31b. The mounting portion 31a and the rotating beacon light 31b are vertically continuous with each other. The mounting portion 31a is mounted on a mounting member 40, which will be described later. The rotating beacon light 31b is visible to people around the cargo handling vehicle 10.

A center axis L2 passing through the center of the quadrangular prism of the indicator light 31 extends vertically. The rotating beacon light 31b lights up over a range of 360° around the center axis L2. The rotating beacon light 31b has a dimension M in each of the front-rear direction and the left-right direction. The dimension M of the rotating beacon light 31b is slightly different from the diameter R of the sensor 25. However, the dimension M of the rotating beacon light 31b may be equal to the diameter R of the sensor 25.

Mounting Member

As shown in FIGS. 2 and 3, the cargo handling vehicle 10 includes the mounting member 40. The mounting member 40 is disposed to mount the sensor 25 and the indicator light 31 on the vehicle body 11. In the embodiment, the mounting member 40 is disposed to mount the sensor 25 and the indicator light 31 on the head cover 22 of the vehicle body 11. The mounting member 40 is located on an upper surface of the mounting plate 20a fixed to the head cover 22. Thus, the upper surface of the mounting plate 20a is a part of the upper surface of the vehicle body 11 on which the mounting member 40 is mounted.

Figure 4:
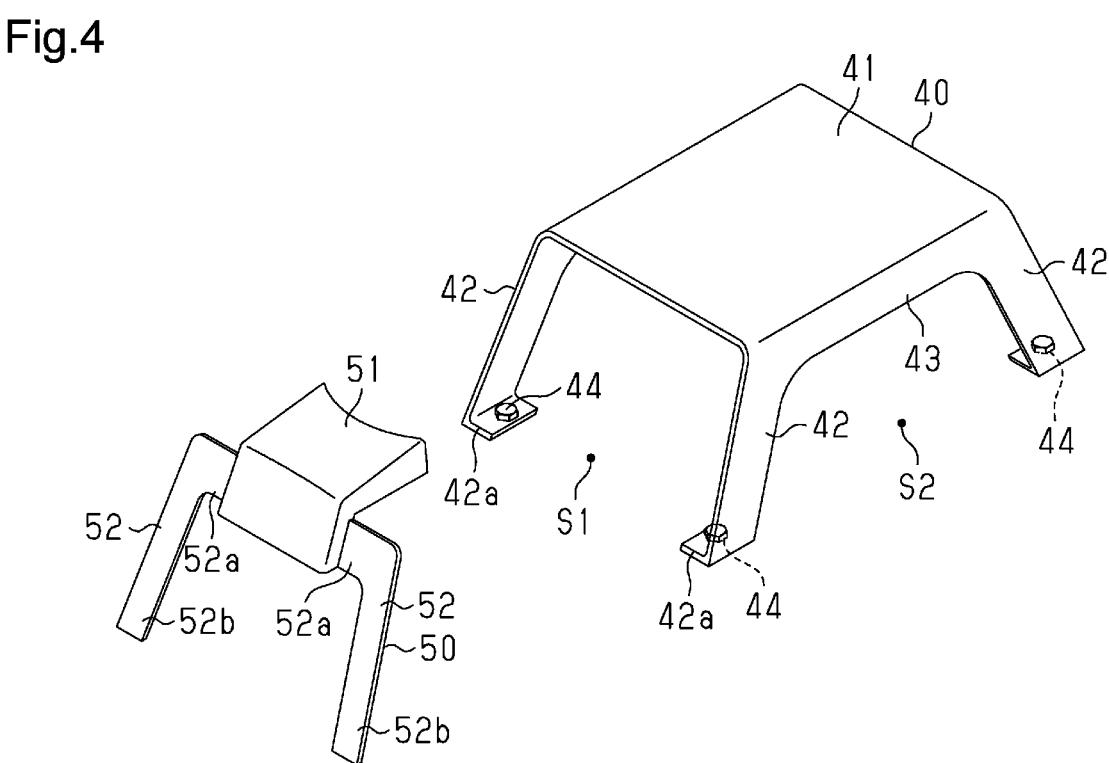
FIG. 4 is an exploded perspective view of the mounting member and the cover member that are shown in FIG. 3.
Figure 5:
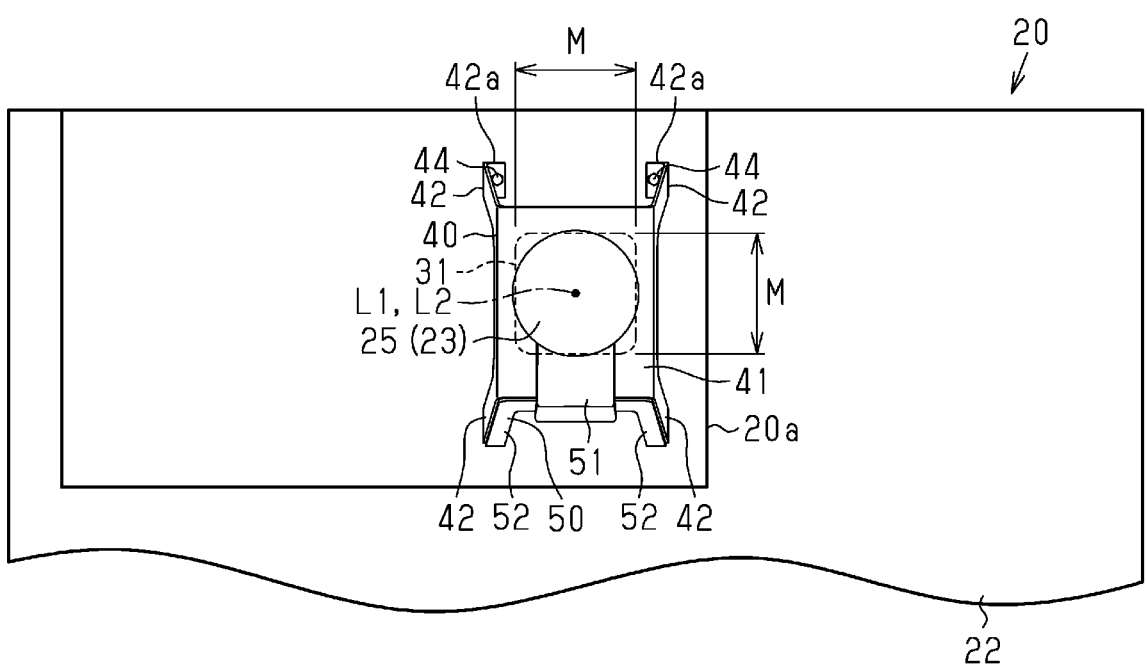
FIG. 5 is a plan view of the head cover of the cargo handling vehicle shown in FIG. 1 and members disposed around the head cover.

As shown in FIGS. 4 and 5, the mounting member 40 includes a mounting portion body 41, legs 42 extending from the mounting portion body 41, and two ribs 43. The legs 42 extend in a direction intersecting the mounting portion body 41. The mounting member 40 is formed by machining a sheet of metal. Specifically, the mounting member 40 is formed by machining a sheet of metal into a shape that allows for formation of the mounting portion body 41, the four legs 42, and the ribs 43, and then bending the legs 42 and the ribs 43 relative to the mounting portion body 41.

The mounting portion body 41 has an elongated rectangular plate shape. The long sides of the mounting portion body 41 extend in the front-rear direction of the vehicle body 11. The short sides of the mounting portion body 41 extend in the left-right direction of the vehicle body 11. One of the two ribs 43 extends in the front-rear direction of the vehicle body 11 along one of the long sides of the mounting portion body 41. The other rib 43 extends in the front-rear direction of the vehicle body 11 along the other long side of the mounting portion body 41. The two ribs 43 are located on the left and right sides of the mounting portion body 41, respectively.

The legs 42 are disposed at four corners of the mounting portion body 41, respectively. Two legs 42 are disposed on each of the left and right sides of the mounting portion body 41. One of the two legs 42 on one of the left and right sides of the mounting portion body 41 extends forward and outward from a front end of the mounting portion body 41, and the other of the two legs 42 extends rearward and outward from a rear end of the mounting portion body 41. In a plan view of the cargo handling vehicle 10 seen from above, the four legs 42 extend radially from the mounting portion body 41. The thickness direction of each of the four legs 42 substantially coincides with the left-right direction of the vehicle body 11.

Figure 6:
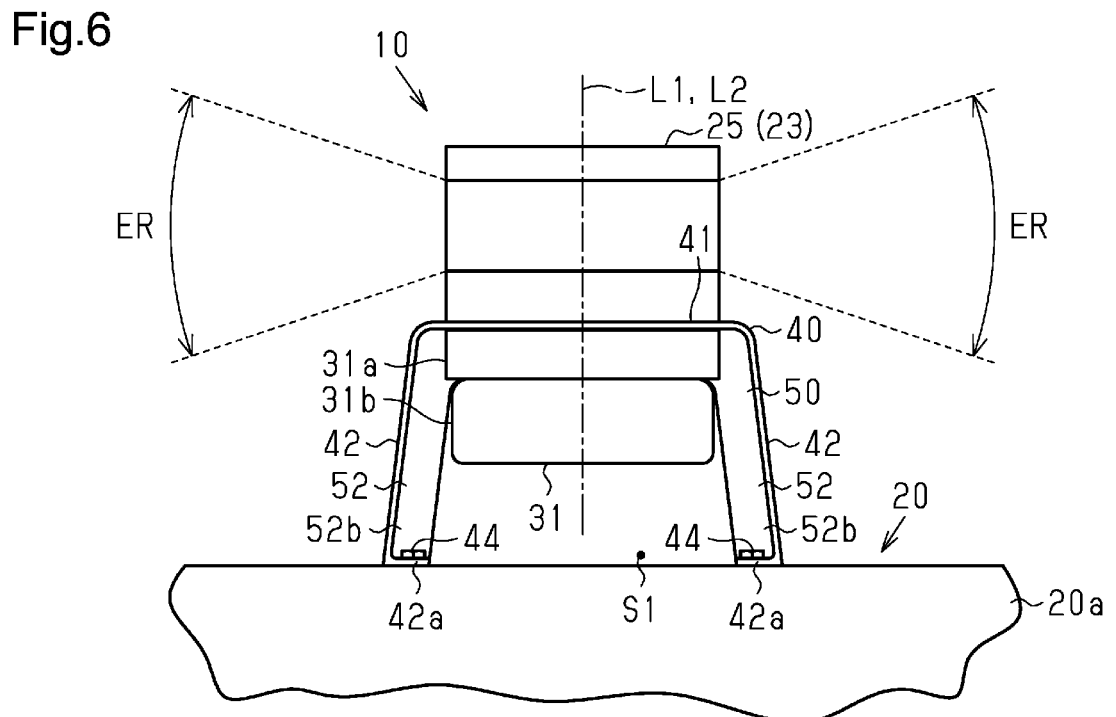
FIG. 6 is a front view of the sensor, the indicator light, and the mounting member that are shown in FIG. 3.
Figures 7, 8:
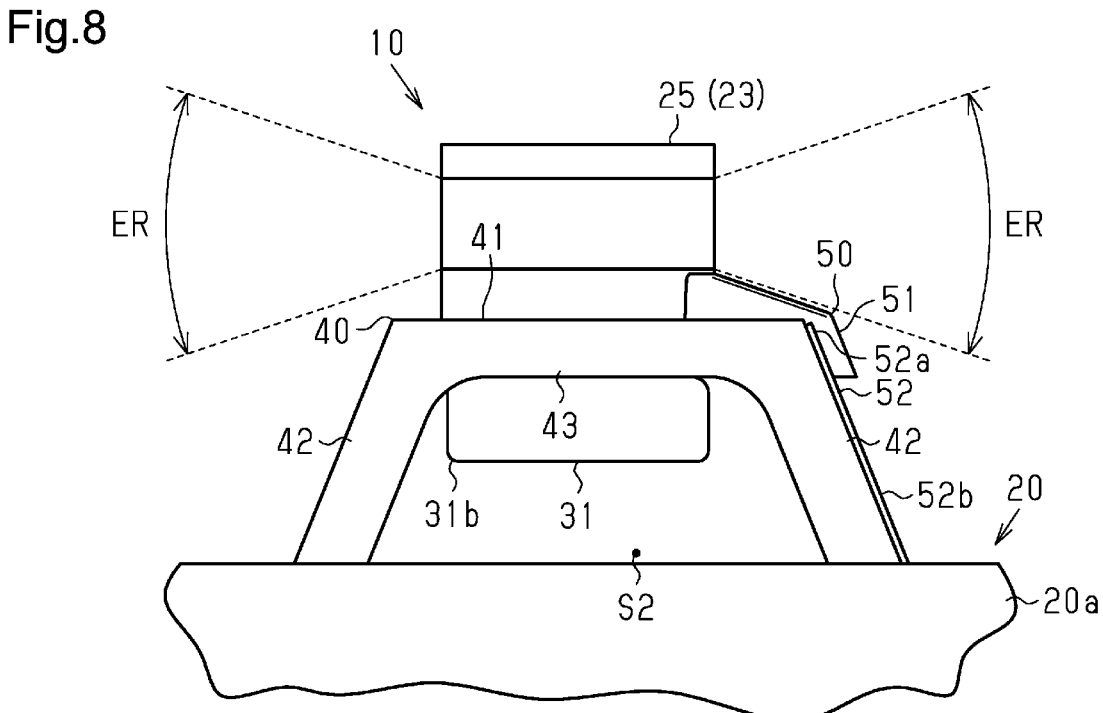
FIG. 7 is a rear view of the sensor, the indicator light, and the mounting member that are shown in FIG. 3.
FIG. 8 is a side view of the sensor, the indicator light, and the mounting member that are shown in FIG. 3.

As shown in FIGS. 6 and 7, on each of the front and rear sides of the mounting portion body 41, the two legs 42 face each other in the left-right direction of the vehicle body 11. On each of the front and rear sides of the mounting portion body 41, the two legs 42 are spaced apart from each other in the left-right direction of the vehicle body 11. On each of the front and rear sides of the mounting portion body 41, a first gap S1 is defined between the two legs 42 in the left-right direction. The dimension of the first gap S1 in the left-right direction gradually decreases from bottom to top. Thus, the two legs 42 facing each other in the left-right direction are tilted toward the mounting portion body 41 from their lower ends toward their upper ends.

As shown in FIG. 8, on each of the left and right sides of the mounting portion body 41, the two legs 42 are spaced apart from each other in the front-rear direction. On each of the left and right sides of the mounting portion body 41, a second gap S2 is defined between the two legs 42 in the front-rear direction. The dimension of the second gap S2 in the front-rear direction gradually decreases from bottom to top. Thus, the two legs 42 facing each other in the front-rear direction are tilted toward the mounting portion body 41 from their lower ends toward their upper ends. The rib 43 extends between the two legs 42 facing each other in the front-rear direction of the vehicle body 11.

As shown in FIG. 3, each of the four legs 42 includes a mounting piece 42a. The mounting piece 42a is bent from the leg 42 to be parallel to the mounting portion body 41. The mounting piece 42a has a rectangular plate shape. A fixing member 44 is inserted through each mounting piece 42a. The fixing member 44 is a bolt. A male screw of the fixing member 44 is fastened to a female screw in the head cover 22 or the mounting plate 20a. Thus, each leg 42 is mounted on the upper surface of the mounting plate 20a, and the mounting member 40 is mounted on the upper surface of the mounting plate 20a.

As shown in FIG. 2, the mounting member 40 is disposed at a central portion of the head cover 22 in the left-right direction and located closer to a front end of the head cover 22 in the front-rear direction. The mounting portion body 41 is disposed at the central portion of the head cover 22 in the left-right direction and located closer to the front end of the head cover 22 in the front-rear direction. The four legs 42 are used to dispose the mounting portion body 41 above the upper surface of the mounting plate 20a. The position of the mounting portion body 41 elevated from the upper surface of the mounting plate 20a can be adjusted by adjusting the protruding lengths of the legs 42 from the mounting portion body 41.

The head cover 22 covers the driver's cabin 19 from above. Thus, the mounting member 40 is positioned higher than a person riding in the driver's cabin 19. Thus, the indicator light 31 mounted on the mounting member 40 is positioned higher than people around the cargo handling vehicle 10. For the indicator light 31 to be visible to people around the cargo handling vehicle 10, the protruding lengths of the legs 42 are adjusted.

Cover Member

As shown in FIGS. 3 and 4, the cargo handling vehicle 10 may include a cover member 50 that is integrated with the mounting member 40. The cover member 50 is mounted on a rear portion of the mounting portion body 41. The cover member 50 is disposed at a rear portion of the mounting portion body 41 and along the two legs 42 at the rear portion of the mounting portion body 41.

The cover member 50 includes an upper cover 51 and two leg covers 52. The upper cover 51 covers a part of the upper surface of the mounting portion body 41 at the rear portion of the mounting portion body 41, and extends downward from a rear end edge of the mounting portion body 41.

Each of the two leg covers 52 includes a first portion 52a laterally extending from a side surface of the upper cover 51 in the left-right direction, and a second portion 52b extending downward from the first portion 52a. The first portions 52a are disposed along the rear end edge of the mounting portion body 41. The second portions 52b are disposed along a rear end edge of the leg 42.

Mounting Structure for Sensor and Indicator Light

As shown in FIGS. 5 to 8, the sensor 25 is mounted on the upper surface of the mounting portion body 41. On the upper surface of the mounting portion body 41, the sensor 25 is mounted in front of the upper cover 51 of the cover member 50. The mounting member 40 is used to elevate the sensor 25 from the upper surface of the mounting plate 20a. The sensor 25 is thus located at the highest position in the cargo handling vehicle 10.

The mounting portion body 41 is sized so as not to fall within the emission range ER of the laser beam emitted from the sensor 25. Thus, the mounting portion body 41 does not block the laser beam emitted from the sensor 25. Accordingly, the mounting portion body 41 does not hinder the sensor 25 from observing an obstacle located around the cargo handling vehicle 10.

As shown in FIG. 3, the cable 25a of the sensor 25 is wired along the upper surface of the mounting portion body 41 and along the inner surface of one leg 42 at the rear portion of the mounting portion body 41. A part of the cable 25a that is wired along the upper surface of the mounting portion body 41 is covered by the upper cover 51 from above, and a part of the cable 25a that is wired along the inner surface of the leg 42 is covered the leg cover 52 from behind.

As shown in FIGS. 6 and 7, the sensor 25 and the indicator light 31 vertically overlap each other, with the mounting portion body 41 located therebetween, to be mounted on the mounting member 40. That is, the sensor 25 and the indicator light 31 are vertically arranged side by side. The indicator light 31 is disposed below the sensor 25. Specifically, the mounting portion 31a of the indicator light 31 is mounted on the lower surface of the mounting portion body 41. The rotating beacon light 31b is mounted on the lower surface of the mounting portion body 41 via the mounting portion 31a. Thus, the indicator light 31 is mounted on the lower surface of the mounting portion body 41.

The view of the cargo handling vehicle 10 from the front as shown in FIG. 6 is referred to as a front view. The view of the cargo handling vehicle 10 from the rear as shown in FIG. 7 is referred to as a rear view. The view of the cargo handling vehicle 10 from the left or right as shown in FIG. 8 is referred to as a side view.

As shown in FIG. 6, in the front view, the indicator light 31 is disposed between the two legs 42 facing each other in the left-right direction. Each of the two legs 42 facing each other in the left-right direction is separated from the indicator light 31. As a result, the indicator light 31 is visible from the first gap S1, which is defined in the front portion of the mounting portion body 41.

As shown in FIG. 7, in the rear view, the indicator light 31 is disposed between the two legs 42 facing each other in the left-right direction. Each of the two legs 42 facing each other in the left-right direction is separated from the indicator light 31. Although the mounting portion 31a is not visible due to the cover member 50, the rotating beacon light 31b protrudes downward from a lower end of the upper cover 51 and a lower end of the first portion 52a. Thus, the rotating beacon light 31b is visible from the first gap S1, which is defined in the rear portion of the mounting portion body 41.

As shown in FIG. 8, in the side view, the indicator light 31 is disposed between the two legs 42 facing each other in the front-rear direction. Each of the two legs 42 facing each other in the front-rear direction is separated from the indicator light 31. In the two legs 42 facing each other in the front-rear direction, the distance between the front leg 42 and the indicator light 31 in the front-rear direction is shorter than the distance between the rear leg 42 and the indicator light 31 in the front-rear direction. Although the mounting portion 31a is not visible due to the rib 43, the rotating beacon light 31b protrudes downward from the lower end of the rib 43. Thus, the rotating beacon light 31b is visible from the second gap S2, which is defined in a side portion of the mounting portion body 41. Hence, the legs 42 are separated from the indicator light 31 in the front view, the rear view, and the side view of the cargo handling vehicle 10. Further, the rotating beacon light 31b is visible in the front view, the rear view, the left view, and the right view of the cargo handling vehicle 10.

The rotating beacon light 31b is elevated from the upper surface of the mounting plate 20a by the mounting member 40. A gap is defined between the lower surface of the rotating beacon light 31b and the upper surface of the mounting plate 20a.

The sensor center axis L1 of the sensor 25 and the center axis L2 of the indicator light 31 are coaxial. As described above, the dimension M of the rotating beacon light 31b is equal to or slightly different from the diameter R of the sensor 25. Thus, in the front view, the rear view, and the side view, the side surface of the sensor 25 and the side surface of the rotating beacon light 31b are vertically aligned on a straight line. The sensor 25 and the indicator light 31 vertically overlap each other, with the mounting portion body 41 located therebetween. As the cargo handling vehicle 10 is viewed from above, the sensor 25 is located within the upper surface of the indicator light 31. That is, the entire sensor 25 overlaps the indicator light 31.

The indicator light 31 is separated from the edge of the mounting portion body 41 toward the center of the mounting portion body 41. As described above, the mounting portion body 41 does not block the laser beam emitted from the sensor 25. Thus, the indicator light 31 located closer to the center than to the edge of the mounting portion body 41 does not block the laser beam emitted from the sensor 25.

Accordingly, the indicator light 31 is located outside the emission range ER of the laser beam from the sensor 25.

Operation of Embodiment

The sensor 25 is mounted on the upper surface of the mounting portion body 41 of the mounting member 40. Thus, the sensor 25 is disposed above the upper surface of the mounting plate 20a by the mounting member 40. Accordingly, an obstacle around the vehicle body 11 can be observed with only a single sensor 25.

The indicator light 31 is mounted on the lower surface of the mounting portion body 41 of the mounting member 40. Thus, the indicator light 31 vertically overlaps the sensor 25 below the sensor 25. Since the sensor 25 and the indicator light 31 are mounted on the mounting member 40, the indicator light 31 and the sensor 25 are not disposed on the same plane as the upper surface of the mounting plate 20a. Accordingly, the indicator light 31 is not located around the sensor 25.

Advantages of Embodiment

The above embodiment has the following advantages.

(1) The mounting member 40 is used so that the sensor 25 and the indicator light 31 vertically overlap each other. The indicator light 31 is arranged below the sensor 25 and located outside the emission range ER of the laser beam from the sensor 25. Thus, the indicator light 31 does not hinder the sensor 25 from observing an obstacle. Further, since the indicator light 31 is located below the sensor 25, the indicator light 31 is not located around the sensor 25. Thus, the visibility of the indicator light 31 is not lowered by the sensor 25. Thus, even with a single sensor 25 and a single indicator light 31, the performance of the sensor 25 that observes the obstacle and the visibility of the indicator light 31 are not lowered.

(2) The indicator light 31 is arranged above the upper surface of the mounting plate 20a by the mounting member 40. This makes the position of the indicator light 31 higher compared to, for example, when the indicator light 31 is disposed along the upper surface of the mounting plate 20a. Thus, the visibility of the indicator light 31 is enhanced.

(3) The mounting member 40 includes the mounting portion body 41 and the legs 42. The legs 42 are used to elevate the mounting portion body 41 from the upper surface of the mounting plate 20a. Since the sensor 25 and the indicator light 31 are mounted on the mounting portion body 41, the sensor 25 and the indicator light 31 are readily disposed above the upper surface of the mounting plate 20a. Further, since the mounting member 40 can be formed by bending a sheet of metal, the mounting member 40 is readily formed. Thus, the mounting structure for the sensor 25 and the indicator light 31 are readily formed using the mounting member 40.

(4) The mounting member 40 includes the four legs 42. The four legs 42 are disposed at four corners of the mounting portion body 41, respectively. Thus, the four legs 42 stably support the mounting portion body 41 on the mounting plate 20a. This configuration stably supports the sensor 25 and the indicator light 31 mounted on the mounting portion body 41.

(5) The legs 42 are separated from the indicator light 31 in the front view, the rear view, and the side view of the cargo handling vehicle 10. Thus, the visibility of the indicator light 31 is not reduced by the legs 42 in the front view, the rear view, or the side view of the cargo handling vehicle 10.

(6) The mounting member 40 includes the ribs 43 on the left and right sides of the mounting portion body 41. The ribs 43 extend between the front and rear legs 42. The ribs 43 reinforce the mounting member 40 in the long side direction, thereby limiting bending of the mounting portion body 41. As a result, the ribs 43 limit the positional change in the sensor 25 and the indicator light 31 in the vertical direction.

(7) The mounting member 40 includes the cover member 50. The cover member 50 covers the cable 25*a* of the sensor 25. This makes the cable 25*a* less visible from around the mounting member 40, and thus limits a decrease in the aesthetic appeal of the cargo handling vehicle 10 caused by the cable 25*a*.

(8) Although the legs 42 have a certain width in the front-rear direction of the vehicle body 11, the legs 42 are separated from the rotating beacon light 31*b* in the side view of the cargo handling vehicle 10. Thus, even if the legs 42 have a certain width, the visibility of the rotating beacon light 31*b* in the side view is not reduced by the legs 42. Additionally, although the legs 42 have a certain thickness in the left-right direction of the vehicle body 11, the legs 42 are separated from the rotating beacon light 31*b* in the front view and the rear view of the cargo handling vehicle 10. Thus, the visibility of the rotating beacon light 31*b* is not reduced by the leg 42 in the front view or the rear view.

The above embodiment may be modified as follows. The above embodiment the following modifications can be combined as long as the combined modifications remain technically consistent with each other.

A part of the rotating beacon light 31*b* may overlap the legs 42 in the front view of the cargo handling vehicle 10. Instead, a part of the rotating beacon light 31*b* may overlap the legs 42 in the rear view of the cargo handling vehicle 10. Alternatively, a part of the rotating beacon light 31*b* may overlap the legs 42 in the side view of the cargo handling vehicle 10. In short, if the visibility of the rotating beacon light 31*b* is not significantly reduced, a part of the rotating beacon light 31*b* may overlap the leg 42 in the front view, the rear view, or the side view.

The arrangement of the four legs 42 may be changed.

The ribs 43 may extend in the left-right direction of the vehicle body 11 along the short sides of the mounting portion body 41. The ribs 43 may be arranged along the long and short sides of the mounting portion body 41. Alternatively, the ribs 43 may be omitted.

The mounting member 40 may include the mounting portion body 41 and one leg 42 extending from the mounting portion body 41. In this case, the leg 42 protrudes from the central portion of the lower surface of the mounting portion body 41. Further, the sensor 25 is mounted on the upper surface of the mounting portion body 41, and the indicator light 31 is mounted on the lower surface of the mounting portion body 41 to be disposed around the leg 42. In this configuration, the visibility of the indicator light 31 is not reduced by the leg 42.

If the sensor 25 and the indicator light 31 are mounted on the mounting member 40 to vertically overlap each other and the indicator light 31 is located outside the emission range ER of the laser beam from the sensor 25, the sensor center axis L1 and the center axis L2 of the indicator light 31 may be shifted from each other. For example, if the indicator light 31 is located outside the emission range ER of the laser beam from the sensor 25, one edge of the indicator light 31 may protrude outward from the edges of the sensor 25 in plan view of the cargo handling vehicle 10.

The dimension M of the indicator light 31 may be larger than the diameter R of the sensor 25 if the sensor 25 and the indicator light 31 are mounted on the mounting member 40 to vertically overlap each other and the indicator light 31 is located outside the emission range ER of the laser beam from the sensor 25.

The sensor 25 is not limited to a cylindrical shape. For example, the sensor 25 may have a quadrangular prism shape. The indicator light 31 is not limited to a quadrangular prism shape. For example, the indicator light 31 may have a cylindrical shape.

The number of the legs 42 may be two, three, five, or more.

The mounting member 40 may be formed by integrating the mounting portion body 41 and the leg 42 through welding.

The mounting member 40 may be formed of a resin material. In this case, the mounting portion body 41 and the leg 42 are integrally formed.

The cargo handling vehicle 10 may be an unmanned vehicle that operates automatically. In this case, the cargo handling vehicle 10 does not need to include the driver's cabin 19 and thus does not include the upper frame 20. The mounting member 40 is preferably mounted on the upper surface of the mast 16 as the upper surface of the vehicle body 11. On the upper surface of the mast 16, the sensor 25 is mounted on the upper surface of the mounting portion body 41 of the mounting member 40, and the indicator light 31 is mounted on the lower surface of the mounting portion body 41. In this configuration, the mast 16 does not hinder the sensor 25 from emitting a laser beam.

If the cargo handling vehicle 10 is an unmanned vehicle in which the cargo handling device 15 does not include the mast 16 or the upper frame 20, the upper surface of the vehicle body 11 may be the instrument panel 19*a*. In this case, at a position relatively near from the instrument panel 19*a*, the sensor 25 is mounted on the upper surface of the mounting portion body 41 of the mounting member 40, and the indicator light 31 is mounted on the lower surface of the mounting portion body 41.

In this case, the instrument panel 19*a* is located at a position lower than the line of sight of a person. Thus, the mounting member 40 is disposed at a position lower than the line of sight of a person. Accordingly, the indicator light 31 mounted on the mounting member 40 is disposed at a position lower than the line of sight of a person around the cargo handling vehicle 10. This allows the indicator light 31 to be readily seen from around the cargo handling vehicle 10. Hence, the protruding lengths of the legs 42 in this configuration may be shorter than those in the embodiment.

Even if the cargo handling vehicle 10 is an unmanned vehicle that operates autonomously, the upper surface of the vehicle body 11 may be the instrument panel 19*a*.

The indicator light 31 may be mounted on the mounting portion body 41 such that the lower surface of the indicator light 31 extends along the upper surface of the mounting plate 20*a*.

To adjust the height of the mounting portion body 41, a spacer may be disposed between the mounting pieces 42*a* and the mounting plate 20*a*. For example, to elevate the front portion of the mounting portion body 41, a spacer is disposed between the upper surface of the mounting plate 20*a* and the lower surfaces of the mounting pieces 42*a* of the two front legs 42 of the mounting portion body 41. In this case, the front portion of the mounting portion body 41 is elevated as compared to when there is a no spacer.

In this configuration, since the spacer is disposed under the two front legs 42, the front portion of the mounting portion body 41 is not elevated only on one side. Thus, the front portion of the mounting portion body 41 is elevated without being tilted left or right. The same applies to the case of elevating a rear portion of the mounting portion body 41 and the case of elevating a left or right portion of the mounting portion body 41.

For the height of the mounting portion body 41 to be adjustable, a ball screw or a suspension may be disposed on each leg 42.

The mounting member 40 may be mounted on the upper surface of the head cover 22 without using the mounting plate 20*a*. In this case, the upper surface of the head cover 22 is the upper surface of the vehicle body 11.

The indicator light 31 may be a state indicator light that indicates the travel speed of the cargo handling vehicle 10 by color. In short, the content indicated by the indicator light 31 may be changed depending on the cargo handling vehicle 10 on which the indicator light 31 is mounted.

The mounting member 40 may separately include a mounting member for the sensor 25 and a mounting member for the indicator light 31. In this case, the sensor 25 is mounted on the upper surface of the mounting member for the sensor 25. Further, the mounting member for the indicator light 31 is disposed below the mounting member for the sensor 25, and the indicator light 31 is mounted on the mounting member for the indicator light 31.

The sensor 25 may be an ultrasonic sensor. The ultrasonic sensor can measure a distance by emitting an ultrasonic wave, which corresponds to an emission wave.

The type of the cargo handling vehicle 10 may be a tow tractor or a forklift.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A sensor and indicator light mounting structure comprising:

a single sensor configured to observe an obstacle by emitting an emission wave to an area around a vehicle body of a cargo handling vehicle and receiving a reflection of the emission wave;

a single indicator light configured to notify a person around the vehicle body of a presence of the cargo handling vehicle; and a mounting member configured to mount the sensor and the indicator light on the vehicle body, wherein the mounting member is configured to be disposed on an upper surface of the vehicle body, the sensor and the indicator light vertically overlap each other to be mounted on the mounting member, the indicator light is arranged below the sensor, the mounting member includes a mounting member body and legs extending from the mounting member body, the sensor is mounted on an upper surface of the mounting member body and the indicator light is mounted on a lower surface of the mounting member body, the legs are configured to be mounted on the upper surface of the vehicle body, and the mounting member is formed by bending a sheet of metal, the legs are respectively disposed at four corners of the mounting member body, and the legs are separated from the indicator light in a front view, a rear view, and a side view of the cargo handling vehicle.

2. The mounting structure according to claim 1, wherein the indicator light is located outside an emission range of the emission wave from the sensor.

3. The mounting structure according to claim 1, wherein the indicator light is arranged above the upper surface of the vehicle body.

4. A cargo handling vehicle, comprising:

a vehicle body;

a single sensor configured to observe an obstacle by emitting an emission wave to an area around the vehicle body and receiving a reflection of the emission wave;

a single indicator light configured to notify a person around the vehicle body of a presence of the cargo handling vehicle; and a mounting member configured to mount the sensor and the indicator light on the vehicle body, wherein the mounting member is configured to be disposed on an upper surface of the vehicle body, the sensor and the indicator light vertically overlap each other to be mounted on the mounting member, the indicator light is arranged below the sensor, the mounting member includes a mounting member body and legs extending from the mounting member body, the sensor is mounted on an upper surface of the mounting member body and the indicator light is mounted on a lower surface of the mounting member body, the legs are configured to be mounted on the upper surface of the vehicle body, and the mounting member is formed by bending a sheet of metal, the legs are respectively disposed at four corners of the mounting member body, and the legs are separated from the indicator light in a front view, a rear view, and a side view of the cargo handling vehicle.

5. The cargo handling vehicle according to claim 4, wherein the indicator light is located outside an emission range of the emission wave from the sensor.

\* \* \* \* \*